Aug. 2, 1938.    R. R. MEAD    2,125,681
TYPOGRAPHICAL COMPOSING MACHINE
Filed July 6, 1936    7 Sheets-Sheet 1

Fig. 1

INVENTOR
Richard R. Mead
BY Morrison, Kennedy Campbell,
ATTORNEYS

Fig. 5

Aug. 2, 1938.  R. R. MEAD  2,125,681
TYPOGRAPHICAL COMPOSING MACHINE
Filed July 6, 1936  7 Sheets-Sheet 6

INVENTOR
Richard R. Mead
BY Morrison, Kennedy & Campbell,
ATTORNEYS

Aug. 2, 1938.   R. R. MEAD   2,125,681
TYPOGRAPHICAL COMPOSING MACHINE
Filed July 6, 1936   7 Sheets-Sheet 7

INVENTOR
Richard R. Mead
BY Morrison, Kennedy Campbell
ATTORNEYS.

Patented Aug. 2, 1938

2,125,681

UNITED STATES PATENT OFFICE 2,125,681

TYPOGRAPHICAL COMPOSING MACHINE

Richard R. Mead, Queens Village, N. Y., assignor to Mergenthaler Linotype Company, a corporation of New York Application July 6, 1936, Serial No. 89,105

30 Claims. (Cl. 199—45)

This invention relates to typographical composing machines, such as Linotype machines of the general organization represented in Letters Patent of the United States, No. 436,532 to O. Mergenthaler, wherein circulating matrices are released from a magazine in the order in which their characters are to appear in print and then assembled in line, the composed line transferred to the face of a mold, the mold filled with molten metal to form a slug or "linotype" against the matrices which produce the type characters thereon, and the matrices thereafter elevated and returned through distributing mechanism to the magazine from which they started.

More particularly it relates to machines of the shiftable multiple magazine variety, such as those known in the trade as Linotype Model 8 and Linotype Model 14. The Model 8 machine is equipped with three main magazines which are shiftable upwardly and downwardly in the machine frame to bring one or another of the magazines into operative relation to the assembling and distributing devices; whereas the Model 14 machine (otherwise the same) is equipped with three auxiliary magazines which are likewise shiftable upwardly and downwardly in the machine frame to bring any selected one thereof into operative relation to the assembling and distributing devices for conjoint use with the selected main magazine.

In the commercial machines, the shifting of the main magazines is effected by a crank handle located at the front of the machine and connected to a system of bevel gearing for the rotation of a threaded nut which advances a screw attached at right angles to the underside of the shift frame. The parts are so designed as to require a minimum effort in shifting the magazines, but require a number of turns (11 actually) of the crank handle in changing from each magazine to the next in the set. As for the auxiliary magazines, the shifting mechanism usually consists of two rotatable cams actuated through a train of gears manually operated by a crank handle located at the side of the shift frame, requiring the operator to leave his seat at the keyboard each time a change of magazines is effected.

The present invention is directed to certain improvements in the magazine raising and lowering mechanism in or for machines of the class stated, the general idea being to provide for a quick, easy and smooth shifting of the magazines in changing from one to another. The improvements have been shown herein as applied to a machine of the Model 14 class employing both main and auxiliary magazines, and the magazine raising and lowering mechanism has been devised so that a single crank handle can be used in shifting the magazines of either set. In this instance, the mechanism has been so designed that a single turn of the crank handle will effect a change from one magazine to the next in shifting either set, and moreover, the effort involved in shifting the magazines has been lightened to such extent that a force of 1 lb. applied to and moved through one rotation of the crank handle will elevate a load of 60 lbs. covering a 2½ inch movement of the magazines. The various improvements by which these and other desirable results are accomplished will best be understood from the detailed description to follow.

In the accompanying drawings, the invention is shown merely in preferred form and by way of example, and obviously many changes and variations may be made therein and in its mode of adaptation which will still be comprised within its spirit. It is to be understood, therefore, that the invention is not limited to any specific form or embodiment except insofar as such limitations are specified in the claims.

Referring to the drawings.

As previously stated, the machine herein illustrated is of the Model 14 class, being equipped with a set of full length main magazines A (three in number), and with a set of auxiliary short length magazines B (likewise three in number). The magazines of both sets are served by a common assembling mechanism denoted generally by the reference letter C and by a common distributing mechanism denoted generally by the reference letter D, it being understood that in machines of the class stated any selected one of the main magazines, as well as any selected one of the auxiliary magazines, may be brought into operative relation to the assembling and distributing mechanisms by the operation of the magazine raising and lowering mechanism. A single keyboard E likewise serves both sets of magazines, this being a well known feature of the Model 14 machine.

The main magazines A are removably mounted on separate base frames $A^1$, conjointly constituting a shift frame which is arranged to be moved upwardly and downwardly in the machine frame by the improved mechanism presently to be described. The selected magazine is located in operative position by means of gage bars F arranged in pairs at opposite sides of the magazines and connected by rigid members $F^1$. These gage bars F are supported at their lower ends upon alining pieces $F^2$ on the fixed machine frame and present their upper ends in position to engage the undersides of alining lugs $F^3$ projecting laterally from the opposite sides of the magazine base frames $A^1$ at both ends thereof. When any selected magazine is brought into operative position, the alining lugs $F^3$ of its base frame will seat upon the gage bars F which thus locate the magazine in proper position with respect to the assembling and distributing mechanisms. In providing for the engagement of the gage bars with the alining lugs, the former are arranged to slide forwardly and backwardly on the fixed alining pieces $F^2$ so as in one position to stand clear of the alining lugs during the shifting of the magazines and, in the other position, to stand beneath the alining lugs on the base frame of the selected magazine, the movement of the gage bars being controlled through a pair of arms $F^4$ rising from a rock shaft $F^5$ and engaging at their upper ends behind pins $F^6$ extending inwardly from the connecting members $F^1$. With this arrangement, when it is desired to change from one magazine to another, the rock shaft $F^5$ is rotated in the appropriate direction to draw the gage bars F forwardly against the tension of their actuating springs $F^7$ out of the path of the magazine alining lugs $F^3$, and then, after the magazines have been raised or lowered to the required extent, the rock shaft is rotated in the opposite direction to permit the springs $F^7$ (which really effect such reverse rotation of the shaft) to restore the gage bars to their original or active position beneath the alining lugs on the base frame of the magazine selected.

The forward or magazine releasing movement of the gage bars F can only take place when there are no matrices in the course of distribution, or no matrices protruding from the lower delivery end of the magazine in operative position. Such control of the gage bars is exercised by two matrix feelers G and $G^1$, the former being movable across the path of the matrices as they travel through the distributor, and the latter being movable across the lower delivery end of the active magazine. The feeler G is pivotally suspended from the distributor bar and is actuated from the gage bars through a connecting lever $G^2$ intermediately pivoted to a fixed part of the machine frame. The lower feeler $G^1$ is slidably supported in the fixed machine frame and is actuated from the gage bars through arms $G^3$ fast upon the rock shaft $F^5$ before alluded to.

The arrangement and operation of the gage bars and the matrix feelers are so well known that any further description would be superfluous but, if desired, reference may be had to the Rogers Patent No. 1,109,872 and the Kennedy Patent No. 1,396,125. The manner in which the magazines are removed is set forth in the McNamara Patent No. 1,586,316.

The auxiliary magazines B are mounted in much the usual way (see Burt Patent No. 1,864,799), being removably carried by individual base frames $B^1$ secured rigidly to a pair of side plates $B^2$, these side plates and the magazine base frames thus constituting a shift frame which can be moved upwardly and downwardly in the machine frame to bring one or another of the auxiliary magazines into operative position. The shift frame is guided in its upward and downward movements by rollers $B^3$, two tracking upon the front edge of each of the side plates, and one tracking upon the rear edge of each side plate. The side plates are both formed with downward extensions $B^4$, each running between a pair of rollers $B^5$ to aid in the guiding of the shift frame.

Figures 3, 4:
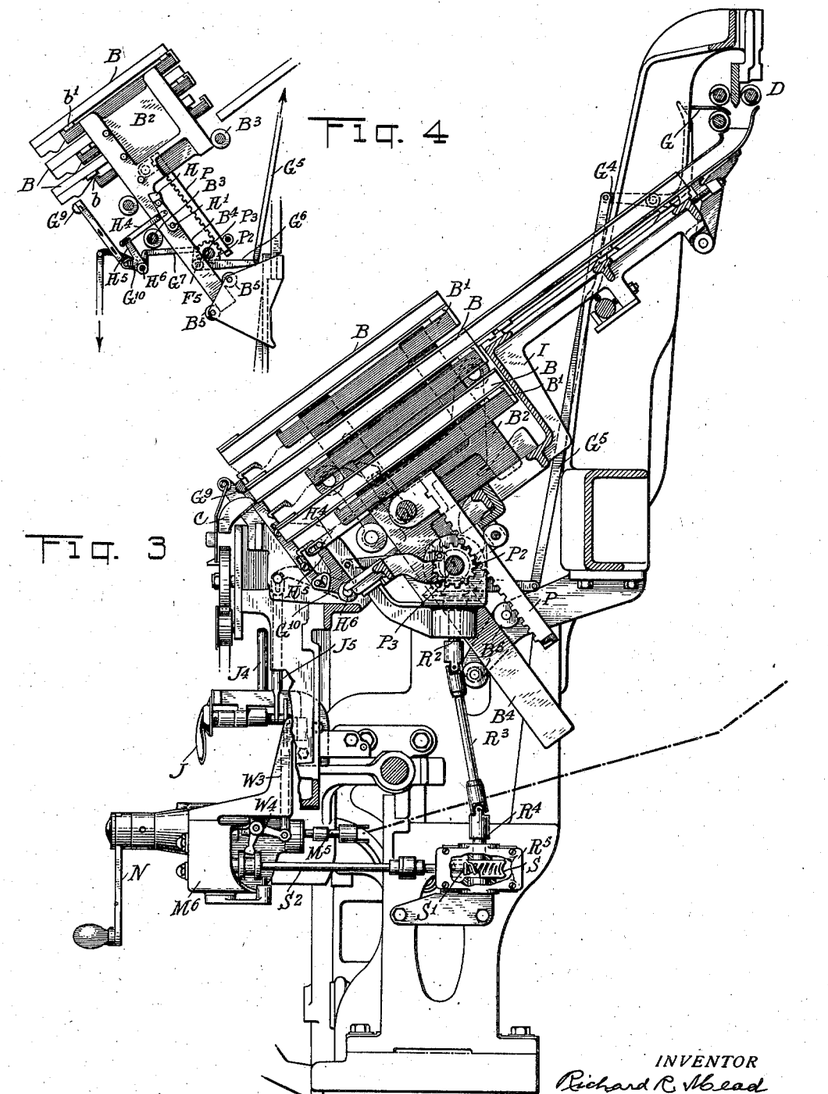
Fig. 3 is a similar view taken approximately on the line 3—3 of Fig. 1, showing the raising and lowering mechanism for the auxiliary magazines, and showing the intermediate magazine in operative position.
Fig. 4 is a view, on a smaller scale, similar to Fig. 3, but showing the auxiliary magazine frame raised to a fourth position for the removal of the lowermost magazine, and also showing some of the connections for the matrix feelers associated with the auxiliary magazines.
Figure 5:
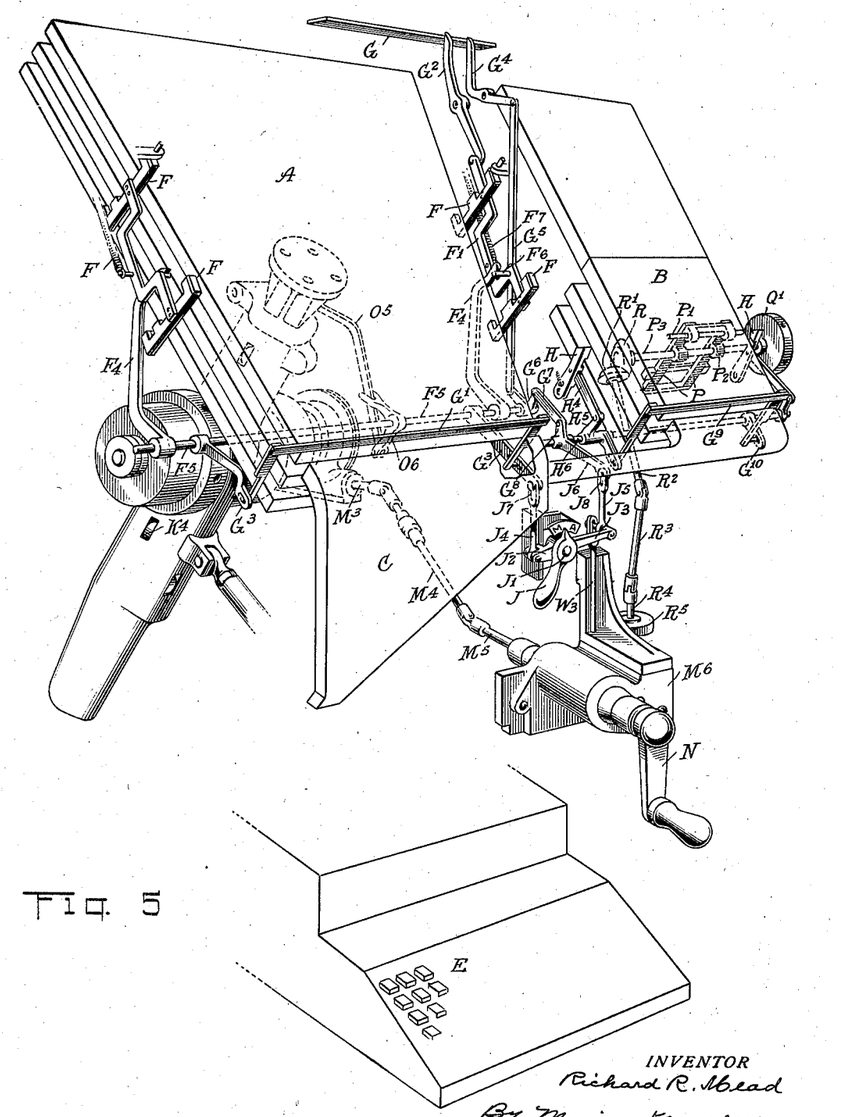
Fig. 5 is a phantom perspective view of the raising and lowering mechanism, and the associated parts, for both the main and the auxiliary magazines.

The mechanism employed for locating the individual auxiliary magazines in operative position is novel but may conveniently be described at this point. The mechanism (Figs. 3, 4, 5 and 11) comprises a pair of pawls H disposed at opposite sides of the magazines and pivoted at their lower ends, as at $H^1$, to the fixed auxiliary magazine supporting frame I. At their upper ends the pawls H are formed with notches $H^2$ which are adapted to receive a pair of studs $H^3$ projecting outwardly from the side plates $B^2$ of the magazine shift frame, there being three pairs of such studs, one for each of the magazines, and an additional pair to permit the shift frame to be supported in a fourth position, as shown in Fig. 4, to aid in the removal of the lowermost magazine. The pawls H are connected by a pair of links $H^4$ to arms $H^5$ rising from a transverse rock shaft $H^6$ journalled in the fixed supporting frame I (see Fig. 3), so that by rotating the shaft in opposite directions the pawls may first be rocked forwardly to disengage the studs $H^3$ of the particular magazine in operative position, thus leaving the magazine shift frame free to be raised or lowered as the case may be, and then later rocked rearwardly again to engage the studs $H^3$ of the new magazine brought into operative position. Springs $H^7$ serve normally to hold the pawls H in their magazine locating position.

As in the case of the main magazines, the auxiliary magazines cannot be shifted while any matrices are in course of distribution or when any matrices protrude from the lower delivery end of the operative magazine. The matrix feeler G, before referred to, serves for the auxiliary as well as the main magazines, but is independently connected to the auxiliary magazine locating pawls H through a lever $G^4$ pivoted to a fixed part of the machine (the distributor bracket), a long vertical link $G^5$, a bell-crank lever $G^6$, a short fore-and-aft link $G^7$, and an arm $G^8$. The arm $G^8$ is fast to the rock shaft $H^6$ by which the pawls H for the auxiliary magazines are operated, while the bell-crank lever $G^6$ is loosely mounted on the rock shaft $F^5$ by which the gage bars F for the main magazines are operated. It will thus be seen that the matrix feeler G is operated by the shaft $H^6$, as well as by the shaft $F^5$, although as just noted the operation of the two shafts is independent. Consequently, the pawls H cannot be released to permit the shifting of the auxiliary magazines unless the matrix feeler G permits. A further matrix feeler $G^9$ is associated with the auxiliary magazines, this feeler being slidably supported in the fixed supporting frame I (in the same way as the feeler $G^{11}$ for the main magazines) for movement across the delivery end of the operative magazine and being connected to a pair of arms $G^{10}$ fast to the rock shaft $H^6$. The pawls H are therefore subject in their operation to the further control of the feeler $G^9$.

Figure 1:
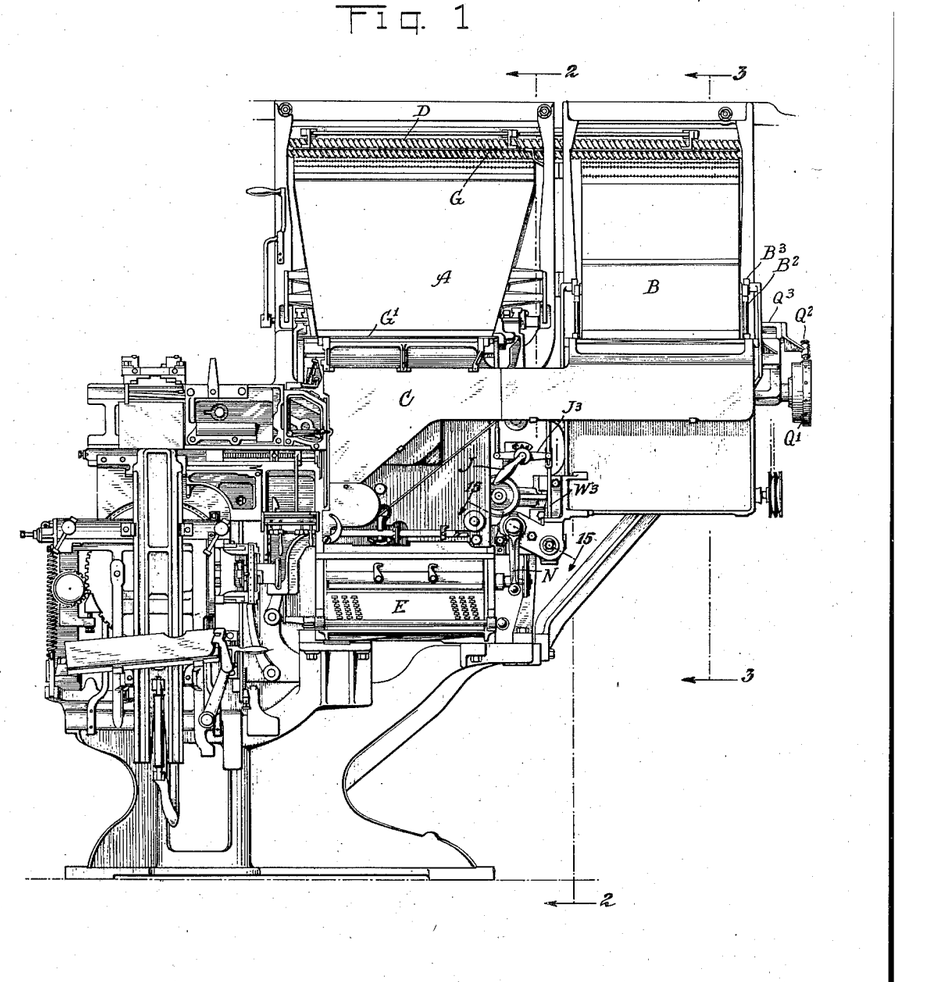
Fig. 1 is a front elevation of a complete machine embodying the present improvements.
Figures 7, 9:
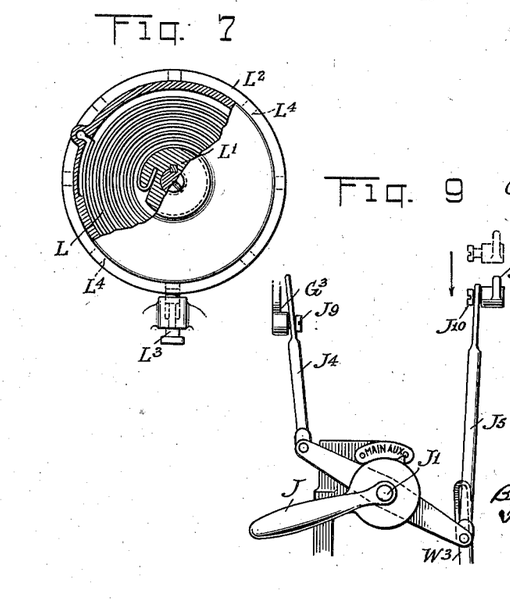
Fig. 7 is a sectional elevation taken on the line 7—7 of Fig. 6 of the counterbalancing spring for the main magazines.
Fig. 9 is a view similar to Fig. 8, but showing the parts in the position they assume when the auxiliary magazines are selected.
Figure 8:
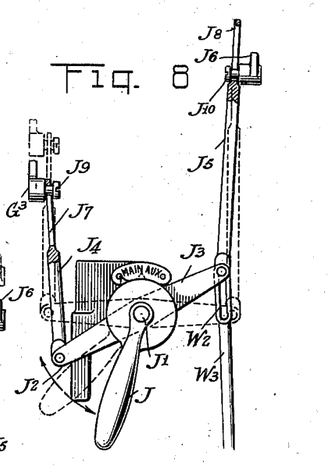
Fig. 8 is a detail view of the clutch shifter by which the main or the auxiliary magazines are selected, and showing by the full lines the position of the parts when the main magazines are selected, and by the dot-and-dash lines the normal position of the parts.
Figure 10:
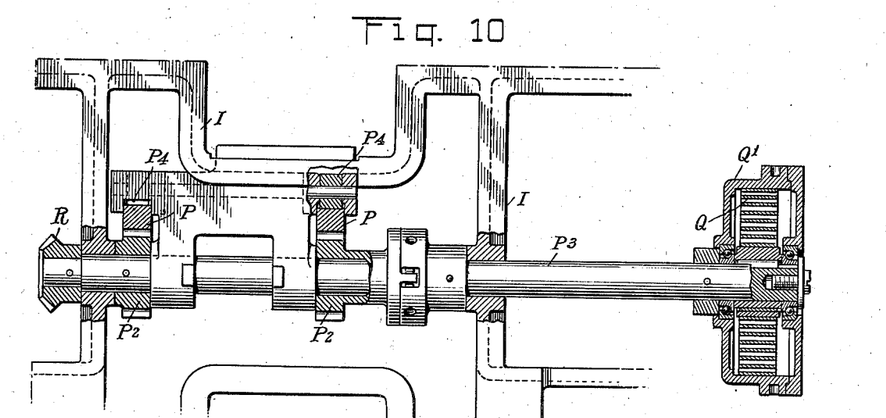
Fig. 10 is a view of the elevating shaft for the auxiliary magazines with certain of the parts shown in section.

At this time it may be convenient to explain that the two rock shafts $F^5$ and $H^6$ are both controlled from a single or common selecting handle J located at the front of the machine within easy reach of the operator while seated at the keyboard (see Fig. 1). This handle J is fast to the forward end of a short fore-and-aft shaft $J^1$ journalled in a suitable supporting bracket on the fixed machine frame and provided at its rear end with a pair of oppositely extending arms $J^2$ and $J^3$, the former being connected by a link $J^4$ to a forward extension of the right hand lever $G^3$ of the rock shaft $F^5$, and the latter being connected by a similar link $J^5$ to an arm $J^6$ fast to the rock shaft $H^6$. The links $J^4$ and $J^5$ are formed at their upper ends with slots $J^7$ and $J^8$ to receive studs $J^9$ and $J^{10}$ carried by the arms $G^3$ and $J^6$, respectively. Normally the handle will occupy the position indicated by the dash lines in Fig. 8, being maintained in that position by the action of the springs $F^7$ for the gage bars F and the springs $H^7$ for the pawls H. When the main magazines are to be shifted, the handle J is turned downwardly from its normal position to the full line position indicated in Fig. 8; whereas when the auxiliary magazines are to be shifted, the handle is turned upwardly from its normal position to the full line position indicated in Fig. 9. It will be noted from Fig. 8 that the depression of the handle J has drawn the lever $G^3$ downwardly to operate the rock shaft $F^5$ (and consequently the gage bars F and matrix feelers G and $G^1$), the stud $J^{10}$ having sufficient play in the slot $J^8$ to leave the arm $J^6$ unaffected. Similarly it will be noted from Fig. 9 that the elevation of the handle J has drawn the arm $J^6$ downwardly to operate the rock shaft $H^6$ (and consequently the pawls H and matrix feelers G and $G^9$), the stud $J^9$ having sufficient play in the slot $J^7$ to leave the arm $G^3$ unaffected. It will be understood that in changing from one magazine to the next in either set, it is not necessary to continue to hold the handle J either up or down, as once the shifting of the magazines has been inaugurated, the gage bars F or the pawls H will, under the influence of their actuating springs $F^7$ or $H^7$, be permitted to snap back into place when the selected magazine arrives in its operative position.

The magazine raising and lowering mechanism, which really constitutes the principal feature of the present invention, will now be described, reference first being made to those parts associated with the main magazine (see Figs. 2, 5, 6, 15 and 16). Depending from and rigidly attached to the lowermost base frame $A^1$ (and therefore constituting a part of the main magazine shift frame) is a rectangular slide K, extending at right angles to the plane of inclination of the magazines and movable upwardly and downwardly in a long housing $K^1$. The housing $K^1$ is accurately positioned in the machine frame, being bolted securely thereto at its upper end as at $K^2$ and supported at its lower end by an adjustable prop or turnbuckle $K^3$. The slide K is guided within the housing $K^1$ solely by rolling contact, the housing being provided for the purpose with rollers $K^4$ running upon accurately machined tracks formed on all four sides of the slide (see Fig. 6 in particular). The main magazines are thus supported and guided solely by means of the single slide K.

Figure 6:
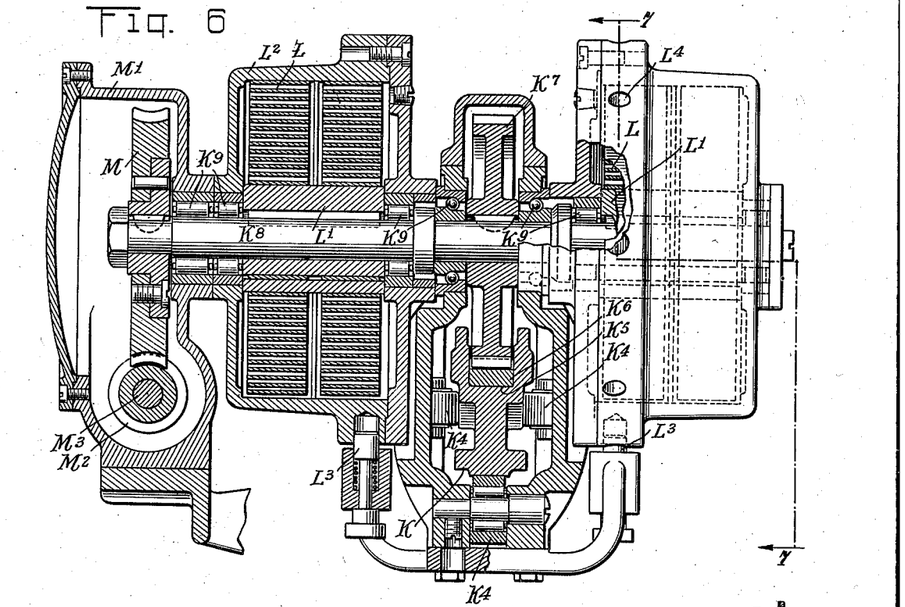
Fig. 6 is a longitudinal section taken through the main magazine elevating shaft on the line 6—6 of Fig. 2.

At its rear edge, the slide K is formed with a longitudinal central channel $K^5$ and has fixed to it within said channel a rack $K^6$ of sufficient length to move the slide from one extreme position to the other. Meshing with the rack $K^6$ is a segmental pinion $K^7$ of a width to fit within the channel $K^5$. The pinion $K^7$ is keyed to a transverse elevating shaft $K^8$ mounted on ball and roller bearings $K^9$ in the housing $K^1$. The ratio of the parts is such that slightly less than a 60° rotation of the shaft $K^8$ (57½° to be exact) will effect a change from one magazine to the next or slightly less than a 120° rotation to change from the lowermost to the uppermost magazine or vice versa. Consequently the teeth of the pinion need only extend through slightly more than 180°. This arrangement, besides facilitating the assembling and disassembling of the parts, permits a quick change from one magazine to another. A stop pin $K^{10}$, fixed to the housing $K^1$ and arranged to engage the segmental pinion, serves to prevent an excessive raising of the slide K.

As best shown in Fig. 6, the shaft $K^8$ extends in both directions from the segmental pinion $K^7$ and is surrounded at each side of the pinion with a pair of closely wound flat spiral springs L, each of which is $\frac{1}{16}''$ thick and $1\frac{1}{4}''$ wide and $25'$ $6''$ long. The two springs of each pair are connected at their inner ends to a sleeve $L^1$ keyed to the shaft $K^8$ (see Fig. 7) and are anchored at their outer ends to a drum-like enclosing casing $L^2$. Each of the casings $L^2$ is rotatably adjustable about the shaft $K^8$ to shift the anchoring point of the corresponding pair of springs and thus increase or decrease the tension exerted by the springs on the elevating shaft. The drums are held in their adjusted position by a pair of spring-pressed plungers $L^3$ mounted in a suitable bracket attached to the housing $K^1$ and arranged to engage each in one or another of series of holes $L^4$ formed in the peripheries of the casings $L^2$. The holes $L^4$, aside from their holding function, also serve as a convenient means of turning the casings in varying the spring tension. The tension of the springs (four in all) is regulated so as approximately to counterbalance the weight of the magazine shift frame and the connected parts, so that little or no effort on the part of the operator will be required in changing from one magazine to another in the use of the machine. The weight of the magazine shift frame will vary in different machines, depending upon the size of the matrices or the kind of magazine in which they are stored (some magazines being made of brass and others of aluminum alloy), and this will explain why it is desirable to provide for altering the tension of the springs L. Due to the symmetrical arrangement and location of the four springs, the torsion exerted on the shaft $K^8$ in actuating the slide K will be equalized. Since the shaft $K^8$ partakes of only a partial rotation (less than a half rotation as above explained) in shifting from the uppermost to the lowermost magazine, the springs L will exert a substantially uniform tension throughout the range of movement and, there being four springs, the counterbalancing effect will be great enough to take care of the heaviest load imposed upon the magazine shift frame.

Figure 2:
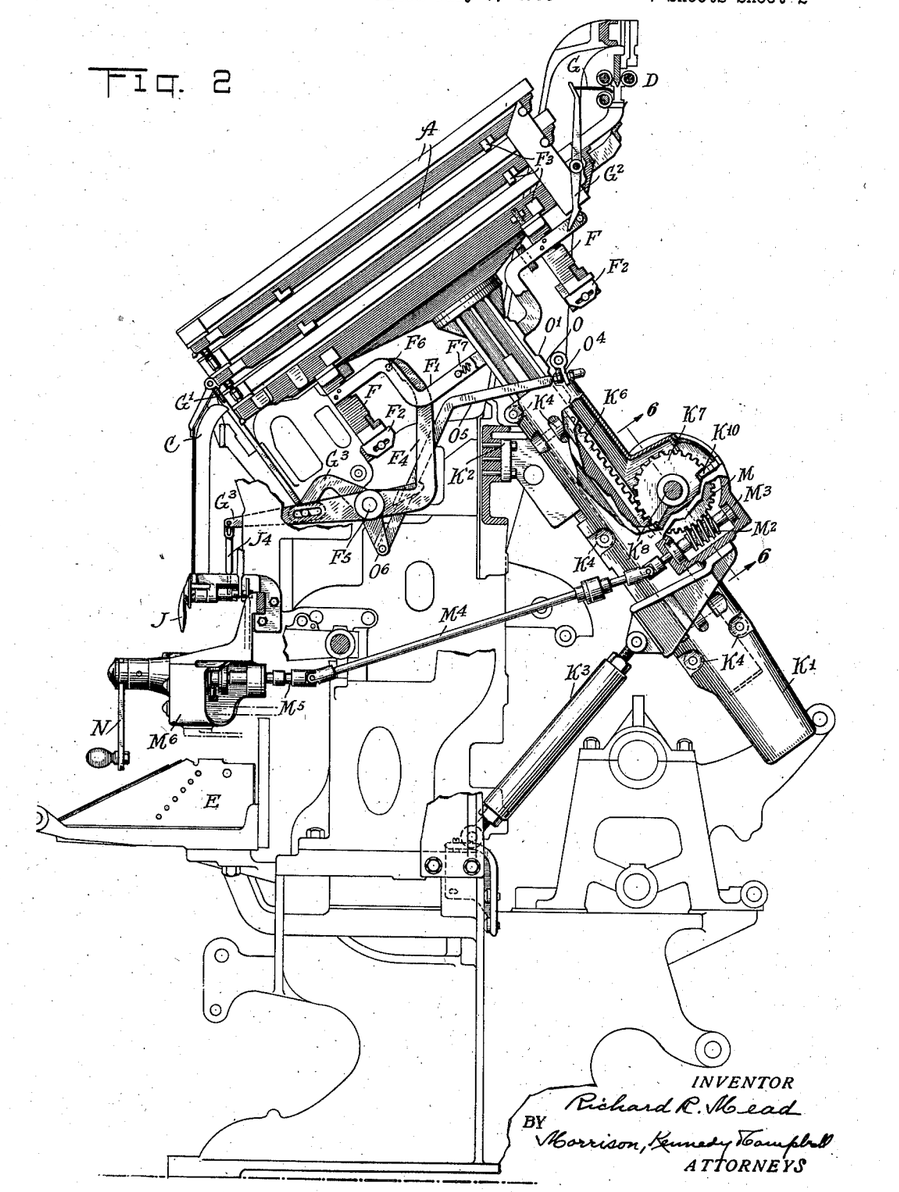
Fig. 2 is a side elevation, partly in section, taken approximately on the line 2—2 of Fig. 1, showing the raising and lowering mechanism for the main magazines, and showing the lowermost main magazine in operative position.
Figure 15:
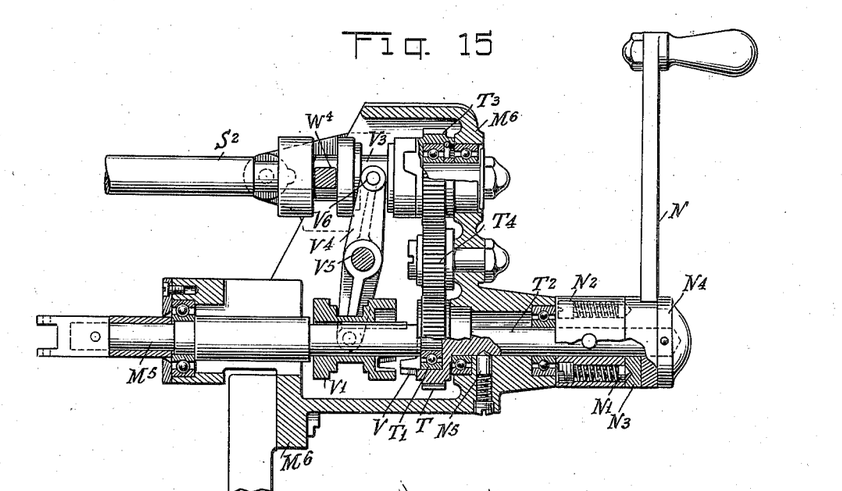
Fig. 15 is a diagonal cross section taken on the line 15—15 of Fig. 1, showing the clutches of the operating shafts for both the main and the auxiliary magazines with the common actuating handle for the two shafts, this view showing the clutch for the auxiliary operating shaft engaged, and the clutch for the main operating shaft disengaged.
Figure 16:
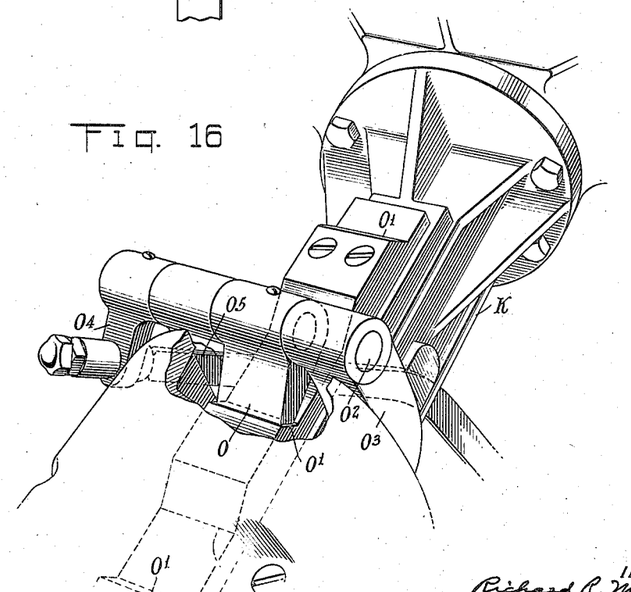
Fig. 16 is an enlarged rear perspective view of the supporting slide for the main magazines with portions of the housing broken away to show the pivoted pawl which cooperates with the slide in locating a selected main magazine in operative position.

As also best shown in Fig. 6, the shaft $K^8$ is extended to the left beyond the spring casing $L^2$ and has keyed to it at its extremity a worm wheel M enclosed within a casing $M^1$ forming a part of the main housing $K^1$. Also arranged within the casing $M^1$ is a worm $M^2$ formed on a short stub shaft $M^3$ journalled in the casing $M^1$ and extending fore-and-aft or perpendicularly to the shaft $K^8$. The worm shaft $M^3$ is connected by means of an inclined universal-jointed shaft $M^4$ to an operating shaft $M^5$ (Figs. 2 and 15). This shaft $M^5$ is mounted on ball bearings in a suitable bracket $M^6$ at the front of the machine adjacent the keyboard and is adapted to be operated by a crank handle N in a manner later to be described. The ratio of the worm wheel M and worm $M^2$ is such that a single rotation of the worm will impart to the segmental pinion $K^7$ its fractional rotation above described in shifting from one magazine to the next in the set. Two complete rotations of the worm will, of course, effect a change from the lowermost to the uppermost magazine or vice versa. The worm and worm wheel arrangement not only provides for the smooth and easy operation of the elevating shaft $K^8$, but in addition serves to keep the shaft under control at all times.

Due to the great lifting power of the counterbalancing springs L, the magazine shift frame under some conditions may have a tendency to float above its final position when a magazine is selected for use. In order to counteract this tendency and to locate the magazine shift frame accurately in its shifted position, there is employed a supplemental magazine locating device in the form of a sturdy pawl O arranged to engage one or another of three stop lugs or teeth $O^1$ formed on the rear side of the slide K and spaced apart at a distance corresponding to that between adjacent magazines (see Figs. 2 and 16). The pawl O is pinned to a short transverse shaft $O^2$ journalled in a suitable supporting brocket $O^3$ on the housing $K^1$, and it is provided at one end with a depending arm $O^4$ connected by a crooked link $O^5$ to an arm $O^6$ depending from the rock shaft $F^5$ before alluded to. These connections are such that when shaft $F^5$ is operated in the manner before described to withdraw the gage bars F for the shifting of the magazines, the pawl O will simultaneously be rocked rearwardly clear of the stop lugs $O^1$ on the slid K; and conversely, when the rock shaft is rotated in the opposite direction to permit the return of the gage bars F to their operative position, the pawl O will be rocked forwardly into engaging relation to the stop lugs $O^1$. Being connected to the rock shaft $F^5$, the pawl O will, of course, be subject to the control of the two matrix feelers G and $G^1$.

The main magazines have thus associated with them two sets of magazine locating devices, one (the gage bars F) cooperating with the individual magazines in the usual way, and the other (the pawl O) cooperating with the magazine supporting slide K. In this connection, it may be noted that the magazines are supported in the shift frame with such precision that the engagement of the pawl O with any one of the three stop lugs $O^1$ will bring about the proper registration of the selected magazine with the assembling and distributing devices, even though such registration is effected through the medium of the shift frame as a whole. It goes without saying that when the weight of the magazines exceeds the lifting power of the counterbalancing springs L, the proper registration of the selected magazine will be taken care of by the gage bars F, as if the pawl O were not present. Whether the gage bars F or the pawl O effect the registration of the selected magazine, the pressure exerted on either will be so negligible as not to interfere with the ready actuation of the parts.

Referring now to the raising and lowering mechanism for the auxiliary magazines B, this mechanism (see Figs. 3, 4, 5, 10 and 15), like that for the main magazines, comprises a rotary elevating shaft, a rack and pinion connection between said shaft and the magazine shift frame, a worm and worm wheel drive for the shaft, and a flat spiral spring connected to the shaft to counterbalance the weight of the magazine shift frame. The details and general arrangement, however, are somewhat different as will immediately be apparent. In this instance, there are employed two racks P depending from a transverse tie rod $P^1$ secured to the side plates $B^2$ of the magazine shift frame; and meshing with these racks, there are two pinions $P^2$ pinned or otherwise fixed to a transverse shaft $P^3$ journalled in suitable bearings in the fixed supporting frame I. The racks P, being pivotally mounted on the tie rod P for the purpose of assemblage and timing of the parts, are held in mesh with the pinions P² by rollers P⁴ mounted on the frame I. In this instance, also, there is but one counterbalancing spring Q, this spring being connected to the right-hand end of the shaft P³ and having its adjustable casing Q¹ locked in its adjusted position by a spring plunger Q² carried by a bracket Q³ attached to the side of the fixed supporting frame I (see Fig. 1). The spring Q is similar in all respects to the individual counterbalancing springs L for the main magazines, but is slightly smaller (being ³⁄₆₄″ thick, 1½″ wide and 22′ 9″ long) because of the lesser power which needs to be exerted in counterbalancing the lighter weight of the auxiliary magazine shift frame.

At its left-hand end, the shaft P³ has pinned to it a bevel gear R meshing with a similar bevel gear R¹ secured to the upper end of a short vertical shaft R² journalled in the fixed supporting frame I. The gear shaft R² is connected by a universal-jointed shaft R³ to a second short vertical shaft R⁴ journalled in a casing R⁵ attached to the fixed machine frame substantially at the level of the hand crank N. Attached to the shaft R⁴, and enclosed within the casing R⁵, is a worm wheel or helical gear S meshing with a right angularly disposed worm or helical gear S¹, the latter also being enclosed in the casing R⁵ and secured to the rear end of a fore-and-aft operating shaft S² arranged below and extending parallel to the operating shaft M⁵ for the main magazines. The shaft S², like the shaft M⁵, is adapted to be rotated by the hand crank N, one rotation thereof (which means one rotation of the worm S¹) being all that is required to shift from one auxiliary magazine to the next. This full rotation of the shaft S² will impart approximately a one-third rotation to the elevating shaft P³, so that the pinions P² (like the pinion K⁷ for the main magazines), partake of only a fractional rotation in changing from one magazine to the next in the auxiliary set. Since the auxiliary magazine shift frame, unlike the main magazine shift frame, is required to occupy a fourth position for the removal of the lowermost magazine (see Fig. 4), the pinions P² in moving the shift frame to that position will naturally partake of a full rotation.

No supplemental magazine locating device is needed for the auxiliary magazines, since the pawls H, due to the upper and lower walls of the notches H², will serve to locate the individual magazines in operative position whether the lifting force of the counterbalancing spring Q is greater or less than the weight of the magazine structure.

It remains to be described how the hand crank N can be connected alternatively to the operating shaft M⁵ for the main magazines and the operating shaft S² for the auxiliary magazines. Referring to Fig. 15, it will be noted that the shaft M⁵ terminates at its forward end within a hollow driving gear T, being in fact rotatably supported by the driving gear through the ball bearing T¹. The gear T is formed on the rear end of a short shaft T² arranged in axial alinement with the shaft M⁵ and supported by ball bearings in the bracket M⁶ before referred to. The hand crank N is freely rotatable on a forward extension of the shaft T², but is normally coupled thereto (as a safety measure) by a slip clutch in the form of two spring-pressed plungers N¹ carried by a sleeve N² pinned to the shaft T² and engaging in depressions formed in the side face of a washer N³ secured to the hub of the hand crank. The crank is confined on the shaft T² by a cap N⁴. A spring-pressed detent N⁵, mounted in the bracket M⁶ and arranged to engage in a depression formed in the shaft T², serves to hold the latter and the attached hand crank yieldingly in their normal position of rest shown in Fig. 1.

The gear T is formed on its rear face with a tooth V to adapt it to serve as one member of a clutch, the other member V¹ of which is splined to the shaft M⁵. Consequently, by shifting the clutch member V¹ forwardly and backwardly on the shaft M⁵, the hand crank N may be connected to or disconnected from the shaft M⁵ as desired. The shaft S² has splined to it a similar clutch member V³ adapted to make and break engagement with a second driving gear T³ freely rotatable on the shaft S² (through a ball bearing mounting) and formed with a tooth V² to adapt the gear to serve as a companion for the clutch member V³. The gear T³ is driven from the gear T through an idler gear T⁴ mounted on the supporting bracket M⁶. It follows, therefore, that the hand crank N can be connected to or disconnected from the operating shaft S² by shifting the clutch member V³ forwardly and rearwardly into and out of engagement with the gear T³, respectively.

The clutch members V¹ and V³ are connected together by a reversing lever V⁴ centrally pivoted at V⁵ to the bracket N⁶ and provided at its extremities with rollers V⁶ engaging in annular grooves formed in the clutch members, whereby the engagement of one clutch member effects the disengagement of the other and vice versa. In this way, the hand crank N may be coupled alone to the operating shaft M⁵ for the main magazines or alone to the operating shaft S² for the auxiliary magazines.

Figures 11, 12, 13, 14:
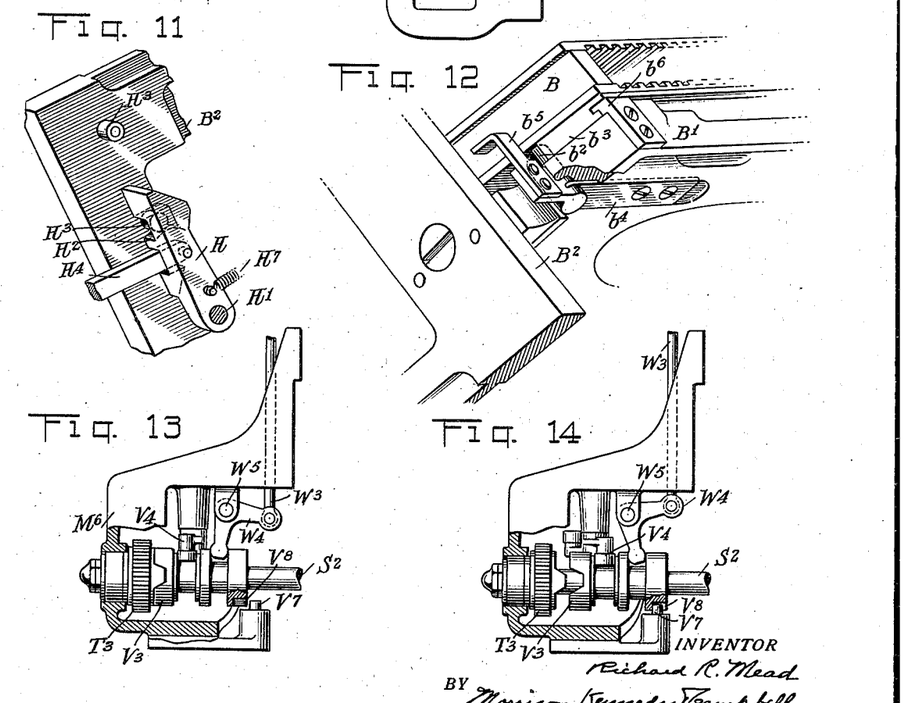
Fig. 11 is a fragmentary perspective view showing one of the notched pawls by which a selected auxiliary magazine is located in operative position.
Fig. 12 is a perspective view of the upper end of an auxiliary magazine showing the safety device associated with each such magazine.
Fig. 13 is a fragmentary sectional view of the clutch on the operating shaft of the auxiliary magazine set, the clutch being shown as engaged in this view.
Fig. 14 is a view similar to Fig. 13, but showing the clutch disengaged and the auxiliary operating shaft locked against accidental rotation.

The shifting of the clutches is controlled by the selecting handle J before referred to. As will be noted from Fig. 5, the arm J³ which leads toward the right from the handle shaft J¹ is provided with a rearwardly extending stud W passing through an elongated slot W² formed in the upper end of a vertical link W³. The link W³, at its lower end, is pivoted to one arm of a bell-crank lever W⁴ centrally pivoted, at W⁵, on the supporting bracket M⁶ and having its other arm engaged in an annular groove formed in the clutch member V³. According to this arrangement, when the handle J is turned downwardly to the full line position shown in Fig. 8, to select the main magazines for shifting, the link W³ will be raised and through the bell-crank lever W⁴ will shift the clutch member V³ forwardly out of engagement with the gear T³, as shown in Fig. 14. This disengaging movement of the clutch member V³, through the reversing lever V⁴, will move the other clutch member V¹ forwardly into engagement with the gear T and thereby connect the hand crank N to the operating shaft M⁵ for the main magazines, as required. On the other hand, when the handle J is turned upwardly to the position shown in Fig. 9, the link W³ will be depressed and through the bell-crank lever W⁴ will move the clutch member V³ forwardly into engagement with the gear T³, as shown in Fig. 13. This forward or engaging movement of the clutch member V³, through the reversing lever V⁴, will shift the other clutch member V¹ rearwardly out of engagement with the gear T and thereby connect the hand crank N to the operating surface S² for the auxiliary magazines, as required. The stud W on the arm J³ has sufficient play in the slot W² to permit the handle J to be returned to its normal position, as indicated by the dash lines in Fig. 8, without disturbing the setting of the clutches. To guard against the accidental rotation of the shaft S² when the hand crank N is disconnected therefrom, the bracket M⁶ is provided with a fixed stud V⁷ which is arranged to engage in an open notch V⁸ formed in the rear end of the clutch member V³ when the latter is moved rearwardly out of engagement with the gear T³ (see Fig. 14). The stud V⁷ will leave the notch V⁸, and thus unlock the shaft S² for rotation, when the clutch member is moved forwardly into engagement with the gear T³ (see Fig. 13).

There is one further feature which needs to be described. As shown in Fig. 4, each of the auxiliary magazines B is supported on its base frame B¹ by means of lips b engaging in front of a cross bar b¹ on the underside of the magazine, so that to remove a selected magazine it need only be raised slightly to disengage the cross bar b¹ from the lips b, as shown in connection with the lowermost magazine in Fig. 4, whereupon the magazine may be slid forwardly from the shift frame. In removing either of the two lower magazines in this manner, the operator may, through carelessness or oversight, lift an overlying magazine far enough to unseat that magazine from its base frame, in which case the overlying magazine would slide forwardly out of the shift frame and perhaps injure the operator or cause damage to the parts. To guard against such a contingency, each of the lower base frames is provided, at its rear end (see Fig. 12), with a small latch or plunger b² arranged to engage in front of the customary rear cross bar b³ on the underside of the magazine. This plunger b² is held in its magazine locking position by a blade spring b⁴ which, however, will yield and allow the plunger to be pressed downwardly out of the way by a finger piece b⁵ when the corresponding magazine is to be removed. In removing a magazine, therefore, the operator is not only required to lift the magazine at its forward end, but also to depress the plunger b² located at its rear end, this being easily done because of the short length of the magazine. It may also be noted that each of the base frames B¹ is provided at its upper corners with small hooks b⁶ which engage in notches formed in the rear edge of the cross bar b³. These hooks prevent the magazines from being accidentally lifted when they are lowered in the machine, as might take place if a matrix were protruding from the upper end of a magazine as that magazine was being lowered into operative position.

The operation of the various parts has, it is believed, been sufficiently explained in the course of the detailed description, so that no further description will be necessary.

Having thus described my invention, what I claim is:

1. In or for a typographical composing machine of the shiftable multiple magazine variety, magazine raising and lowering mechanism comprising a rotary shaft, an operative connection between said shaft and the magazines, means for rotating the shaft in opposite directions to raise and lower the magazines, and a flat spiral counterbalancing spring connected at one end to the rotary shaft and anchored at the opposite end to a relatively fixed part of the machine, said counterbalancing spring acting constantly to rotate the shaft in a magazine raising direction while permitting the shaft to be rotated in the opposite or a magazine lowering direction.

2. In or for a typographical composing machine of the shiftable multiple magazine variety, magazine raising and lowering mechanism comprising a rotary shaft, an operative connection between said shaft and the magazines, means for rotating the shaft in opposite directions to raise and lower the magazines, a flat spiral counterbalancing spring connected at one end to the rotary shaft and anchored at the opposite end to a relatively fixed part of the machine said counterbalancing spring acting constantly to rotate the shaft in a magazine raising direction while permitting the shaft to be rotated in the opposite or a magazine lowering direction, and means for shifting the anchoring point of the spiral spring to vary its counterbalancing effect as desired.

3. In or for a typographical composing machine of the shiftable multiple magazine variety, magazine raising and lowering mechanism comprising a rotary shaft, an operative connection between said shaft and the magazines, means for rotating the rotary shaft, a flat spiral counterbalancing spring connected at one end to the shaft, and a housing for the spring to which it is anchored at the other end, said housing being adjustable about the shaft to vary the counterbalancing effect of the spring as desired.

4. In or for a typographical composing machine of the shiftable multiple magazine variety, magazine raising and lowering mechanism comprising a supporting slide connected to the magazines, a rack carried by the slide, a pinion meshing with the rack, a rotary shaft to which the pinion is fixed, a worm wheel also fixed to said shaft, a worm meshing with the worm wheel, means for rotating the worm in opposite directions to raise and lower the magazines, and two flat spiral counterbalancing springs connected at one end to the rotary shaft and at the opposite end to a relatively fixed part of the machine, said springs being disposed at opposite sides of the magazine supporting slide to equalize the torsion exerted on the shaft in actuating the slide.

5. In or for a typographical composing machine of the shiftable multiple magazine variety, magazine raising and lowering mechanism comprising a supporting slide connected to the magazines, a housing for the slide, rollers mounted in the housing and serving to guide the slide in its up and down movements solely by rolling contact, and means for actuating the magazine supporting slide.

6. In or for a typographical composing machine of the shiftable multiple magazine variety, magazine raising and lowering mechanism comprising a pair of racks connected to the magazines, a pair of pinions meshing with the racks, a rotary shaft to which the pinions are fixed, a second shaft geared to said rotary shaft and having a worm wheel fixed thereto, a worm meshing with the worm wheel, and means for rotating the worm in opposite directions to raise and lower the magazines.

7. In or for a typographical composing machine adapted to be equipped with a plurality of shiftable main magazines and a plurality of shiftable auxiliary magazines, magazine raising and lowering mechanism comprising two independent rotary shafts, one for the main and the other for the auxiliary magazines, a rack and pinion connection between each shaft and the corresponding set of magazines, a worm and worm wheel drive for each said shaft, a single operating means, and means for coupling said operating means to one or the other of said worm and worm wheel drives according to whether the main or the auxiliary magazines are to be raised and lowered.

8. In or for a typographical composing machine adapted to be equipped with a plurality of shiftable main magazines and a plurality of shiftable auxiliary magazines, magazine raising and lowering mechanism comprising a supporting slide connected to the main magazines, a rack carried by the slide, a pinion meshing with the rack, a rotary shaft to which the pinion is fixed, a worm wheel fixed to said shaft, a worm meshing with the worm wheel, a pair of racks connected to the auxiliary magazines, a pair of pinions meshing with the racks, a second rotary shaft to which the pinions are fixed, a further shaft geared to the second rotary shaft and having a worm wheel fixed thereto, a second worm meshing with the last-mentioned worm wheel, a single operating device, and means for coupling said operating device to the drive worm for either the main or the auxiliary magazines as desired.

9. Magazine raising and lowering mechanism according to claim 7, characterized by the fact that a single rotation of the drive worm for either the main or the auxiliary magazines will effect a change from each magazine to the next.

10. In or for a typographical composing machine of the shiftable multiple magazine variety, magazine raising and lowering mechanism comprising a rotary shaft, a rack and pinion connection between said shaft and the magazines, counterbalancing means connected to the rotary shaft and tending constantly to raise the magazines, and a magazine locating device operative to hold the magazines against upward movement when a selected magazine is brought into operative position.

11. Magazine raising and lowering mechanism according to claim 10, including means for moving the magazine locating device to and from operative position in shifting from one magazine to another.

12. Magazine raising and lowering mechanism according to claim 10, including a matrix feeler connected to the magazine locating device and serving to prevent its movement to inoperative position except when the magazines are free to be shifted.

13. In or for a typographical composing machine of the shiftable multiple magazine variety, magazine raising and lowering mechanism comprising a single supporting slide connected to the magazines, means for actuating the slide, and automatically operated means cooperating with the slide to locate the individual magazines in operative position.

14. In or for a typographical composing machine of the shiftable multiple magazine variety, magazine raising and lowering mechanism comprising a single supporting slide connected to the magazines, means for actuating the slide, counterbalancing means tending constantly to raise the slide, and an automatically operated magazine locating device cooperating with the slide to hold it against upward movement when a selected magazine is brought into operative position.

15. In or for a typographical composing machine of the shiftable multiple magazine variety, magazine raising and lowering mechanism comprising a single supporting slide connected to the magazines, means for actuating the slide, counterbalancing means tending constantly to raise the slide, a plurality of stops formed on the slide at different points in its length, there being one stop for each magazine, and a magazine locating pawl operable to engage one or another of said stops according to the magazine selected.

16. In or for a typographical composing machine of the shiftable multiple magazine variety, magazine raising and lowering mechanism comprising a single supporting slide connected to the magazines, means for actuating the slide, counterbalancing means tending constantly to raise the slide, and two magazine locating devices, one cooperating with the individual magazines and the other with the supporting slide, substantially in the manner and for the purpose described.

17. In or for a typographical composing machine adapted to be equipped with a plurality of shiftable main magazines and a plurality of shiftable auxiliary magazines, magazine raising and lowering mechanism comprising two independent rotary shafts, one for the main and the other for the auxiliary magazines, a rack and pinion connection between each shaft and the corresponding set of magazines, means for rotating the shafts in opposite directions to raise and lower the magazines, counterbalancing means connected to each shaft and tending constantly to raise the corresponding set of magazines, a magazine locating device associated with each set of magazines and operative to hold the magazines of that set against upward movement when a selected magazine is brought into operative position, and common means for controlling the operation of the magazine locating devices of the two sets of magazines.

18. In or for a typographical composing machine adapted to be equipped with a plurality of shiftable main magazines and a plurality of shiftable auxiliary magazines, the combination of a matrix feeler associated with the main magazines, a separate matrix feeler associated with the auxiliary magazines, and common operating means for said feelers.

19. In or for a typographical composing machine adapted to be equipped with a plurality of shiftable main magazines and a plurality of shiftable auxiliary magazines, the combination of a matrix feeler associated with the main magazines, a separate matrix feeler associated with the auxiliary magazines, and a common operating device for said feelers, said device being movable in one direction to operate the feeler for the main magazines, and movable in the opposite direction to operate the feeler for the auxiliary magazines.

20. In or for a typographical composing machine adapted to be equipped with a plurality of shiftable main magazines and a plurality of shiftable auxiliary magazines, magazine raising and lowering mechanism comprising two operating shafts, one for the main magazines, and the other for the auxiliary magazines, a single actuating device for said shafts, a clutch on each shaft for coupling it to and uncoupling it from the actuating device, a shifter connected to one of the clutches, and connections between the two clutches whereby the engagement of one effects the disengagement of the other and vice versa.

21. In or for a typographical composing machine adapted to be equipped with a plurality of shiftable main magazines and a plurality of shiftable auxiliary magazines, magazine raising and lowering mechanism comprising two operating shafts, one for the main magazines, and the other for the auxiliary magazines, a single actuating device for said shafts, a clutch on each shaft for coupling it to and uncoupling it from the actuating device, a shifter connected to one of the clutches, connections between the two clutches whereby the engagement of one effects the disengagement of the other and vice versa, and a lock for the auxiliary operating shaft arranged to be engaged and disengaged automatically as the clutch on said shaft is disengaged and engaged respectively.

22. In or for a typographical composing machine adapted to be equipped with a plurality of shiftable main magazines and a plurality of shiftable auxiliary magazines, magazine raising and lowering mechanism comprising two operating shafts, one for the main magazines, and the other for the auxiliary magazines, driving gears loosely mounted on the respective shafts, an idler gear connecting the driving gears, a rotatable actuating handle connected to one of the driving gears, a clutch member splined to each shaft and shiftable thereon to couple it to or uncouple it from the driving gear mounted thereon, a shifter connected to one of the clutches, and connections between the two clutch members whereby the engagement of one effects the disengagement of the other and vice versa.

23. Magazine raising and lowering mechanism according to claim 20, wherein the clutch shifter is controlled in its operation by matrix feelers associated with both the main and the auxiliary magazines.

24. Magazine raising and lowering mechanism according to claim 20, wherein the clutch shifter is controlled in its operation by matrix feelers associated with both the main and the auxiliary magazines, said shifter being movable in one direction to couple the actuating device to the operating shaft for the main magazines as well as to operate the matrix feeler associated with said magazines and movable in the opposite direction to couple the actuating device to the operating shaft for the auxiliary magazines as well as to operate the matrix feeler associated with those magazines.

25. In a typographical composing machine, the combination of an inclined matrix magazine, a base frame on which the magazine is mounted and from which the magazine is adapted to be lifted for removal in a forward direction, and safety means adapted until released to hold the magazine against forward movement on the base frame when lifted therefrom for removal.

26. In a typographical composing machine, the combination of an inclined matrix magazine formed at its forward end and on its underside with a cross bar, a base frame on which the magazine is removably supported, said base frame being formed at its forward end with upstanding lips to engage in front of the magazine cross bar, whereby the magazine may be removed from the base frame in a forward direction by lifting it upwardly far enough to disengage the lips on the base frame from the cross bar of the magazine, and a depressible spring-actuated safety latch attached to the base frame at its upper end and arranged to engage in front of a second cross bar formed on the underside of the magazine at its upper end.

27. In or for a typographical composing machine of the shiftable multiple magazine variety, magazine raising and lowering mechanism comprising a supporting slide connected to the magazines, a rack carried by the slide, a pinion meshing with the rack, a rotary shaft to which the pinion is fixed, a worm wheel also fixed to said shaft, a worm meshing with the worm wheel, means for rotating the worm in opposite directions to raise and lower the magazines, said magazine raising and lowering mechanism being characterized by the fact that a single rotation of the worm effects a change from each magazine to the next.

28. In or for a typographical composing machine of the shiftable multiple magazine variety, magazine raising and lowering mechanism comprising a supporting slide connected to the magazines, a rack carried by the slide, a pinion meshing with the rack, a rotary shaft to which the pinion is fixed, a worm wheel also fixed to said shaft, a worm meshing with the worm wheel, means for rotating the worm in opposite directions to raise and lower the magazines, said magazine raising and lowering mechanism being characterized by the fact that the worm partakes of a full rotation and the pinion of a part rotation only in shifting from each magazine to the next.

29. A typographical composing machine comprising a column of superposed inclined matrix magazines mounted in the machine frame for free sliding movement in an upward and downward direction, a rack and pinion mechanism for raising and lowering the magazine column, an operating handle located at the front of the machine and connected to the pinion shaft by a worm drive, and a spiral spring arrangement surrounding the pinion shaft and attached at one end thereto and attached at the other end to a relatively fixed part of the machine, characterized in this that the ratio of the parts is such that a single rotation of the operating handle will effect a change from one magazine to the next in the magazine column and involves only a partial rotation of the pinion shaft, thereby enabling the spring arrangement to exert a substantially uniform counterbalancing influence on the magazine column throughout its full range of movement.

30. In a typographical composing machine comprising two columns of superposed inclined magazines mounted side by side in the machine frame for free sliding movement in an upward and downward direction, a rack and pinion mechanism for raising and lowering each magazine column, an operating handle located at the front of the machine and adapted to be connected to either of the pinion shafts through a worm drive, and a spiral spring arrangement surrounding the pinion shaft of each magazine column and attached at one end thereto and attached at the other end to a relatively fixed part of the machine, characterized in this that the ratio of the parts is such that a single rotation of the operating handle when connected to either magazine column effects a change from one magazine to the next in the column and involves only a partial rotation of either pinion shaft, thereby enabling the spiral spring arrangements to exert a substantially uniform counterbalancing influence on their respective magazine columns throughout the full range of movement of the latter.

RICHARD R. MEAD.